United States Patent
Bernat et al.

(10) Patent No.: US 11,537,447 B2
(45) Date of Patent: Dec. 27, 2022

(54) TECHNOLOGIES FOR PROVIDING EFFICIENT MIGRATION OF SERVICES AT A CLOUD EDGE

(71) Applicant: INTEL CORPORATION, Santa Clara, CA (US)

(72) Inventors: Francesc Guim Bernat, Barcelona (ES); Karthik Kumar, Chandler, AZ (US); Susanne M. Balle, Hudson, NH (US); Ignacio Astilleros Diez, Madrid (ES); Timothy Verrall, Pleasant Hill, CA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/969,728

(22) PCT Filed: Jun. 29, 2018

(86) PCT No.: PCT/US2018/040244
§ 371 (c)(1),
(2) Date: Aug. 13, 2020

(87) PCT Pub. No.: WO2020/005272
PCT Pub. Date: Jan. 2, 2020

(65) Prior Publication Data
US 2021/0103481 A1 Apr. 8, 2021

(51) Int. Cl.
*G06F 9/50* (2006.01)
*G06F 9/48* (2006.01)

(52) U.S. Cl.
CPC .......... *G06F 9/5088* (2013.01); *G06F 9/4856* (2013.01); *G06F 9/4881* (2013.01); *G06F 9/5072* (2013.01); *G06F 2209/484* (2013.01)

(58) Field of Classification Search
CPC .... G06F 9/5088; G06F 9/4856; G06F 9/4881; G06F 9/5072; G06F 2209/484
See application file for complete search history.

(56) References Cited

U.S. PATENT DOCUMENTS 10,404,579 B1 * 9/2019 Biemueller ......... H04L 61/2084
2014/0173232 A1 * 6/2014 Reohr ................. H04L 67/1097
711/162

(Continued)

FOREIGN PATENT DOCUMENTS

| WO | WO2018068863 | 4/2018 |
| WO | WO2018106162 | 6/2018 |
| WO | 2020/005272 A1 | 10/2020 |

OTHER PUBLICATIONS

PCT Search Report and Written Opinion prepared for PCT/US2018/040244, completed Mar. 7, 2019.

(Continued)

*Primary Examiner* — Sisley N Kim
(74) *Attorney, Agent, or Firm* — Hanley, Flight & Zimmerman, LLC (57) ABSTRACT

Technologies for providing efficient migration of services include a server device. The server device includes compute engine circuitry to execute a set of services on behalf of a terminal device and migration accelerator circuitry. The migration accelerator circuitry is to determine whether execution of the services is to be migrated from an edge station in which the present server device is located to a second edge station in which a second server device is located, determine a prioritization of the services executed by the server device, and send, in response to a determination that the services are to be migrated and as a function of the determined prioritization, data utilized by each service to (Continued)

the second server device of the second edge station to migrate the services. Other embodiments are also described and claimed.

25 Claims, 8 Drawing Sheets

(56) References Cited

U.S. PATENT DOCUMENTS

2019/0191344 A1* 6/2019 Wen .................... G06F 9/45558
2019/0342797 A1* 11/2019 Fu ........................ H04W 36/22

OTHER PUBLICATIONS

Mobile Edge Computing (MEC); End to End Mobility Aspects, ETSI GR MEC 018 V1.1.1 (Oct. 2017), pp. 1-52.
Mobile Edge Computing (MEC);Technical Requirements, ETSI GS MEC 002 V1.1.1 (Mar. 2016), pp. 1-40.
International Bureau, "International Preliminary Report on Patentability," issued in connection with PCT patent application No. PCT/US2018/0040244, dated Dec. 29, 2020, 10 pages.

* cited by examiner

TECHNOLOGIES FOR PROVIDING EFFICIENT MIGRATION OF SERVICES AT A CLOUD EDGE

CROSS REFERENCE TO RELATED APPLICATIONS

The present application is a national stage entry under 35 USC § 371(b) of International Application No. PCT/US2018/040244, filed Jun. 29, 2018.

BACKGROUND

Typically, a centralized data center (e.g., a cloud data center) executes services (e.g., applications, processes, etc.) on behalf of a client device that is in communication with the data center through a network. A drawback of such systems is that that the latency incurred in communicating data between the client device and the data center may diminish the benefits obtained by offloading the operations in the first place (e.g., rather than performing the operations on the client device itself). In situations in which latency is particularly important, such as in autonomous vehicle control operations, one or more server devices may be located closer to the client device (e.g., a compute device of an autonomous vehicle), such as in an edge station (e.g., a small cell, a base station, etc.) that is in communication with the client device (e.g., through a radio access network). However, as the vehicle continues to travel (e.g., out of a predefined communication range of the edge station), the connection between the edge station and the client device may degrade, diminishing or eliminating the ability of the server device to continue providing services for the client device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
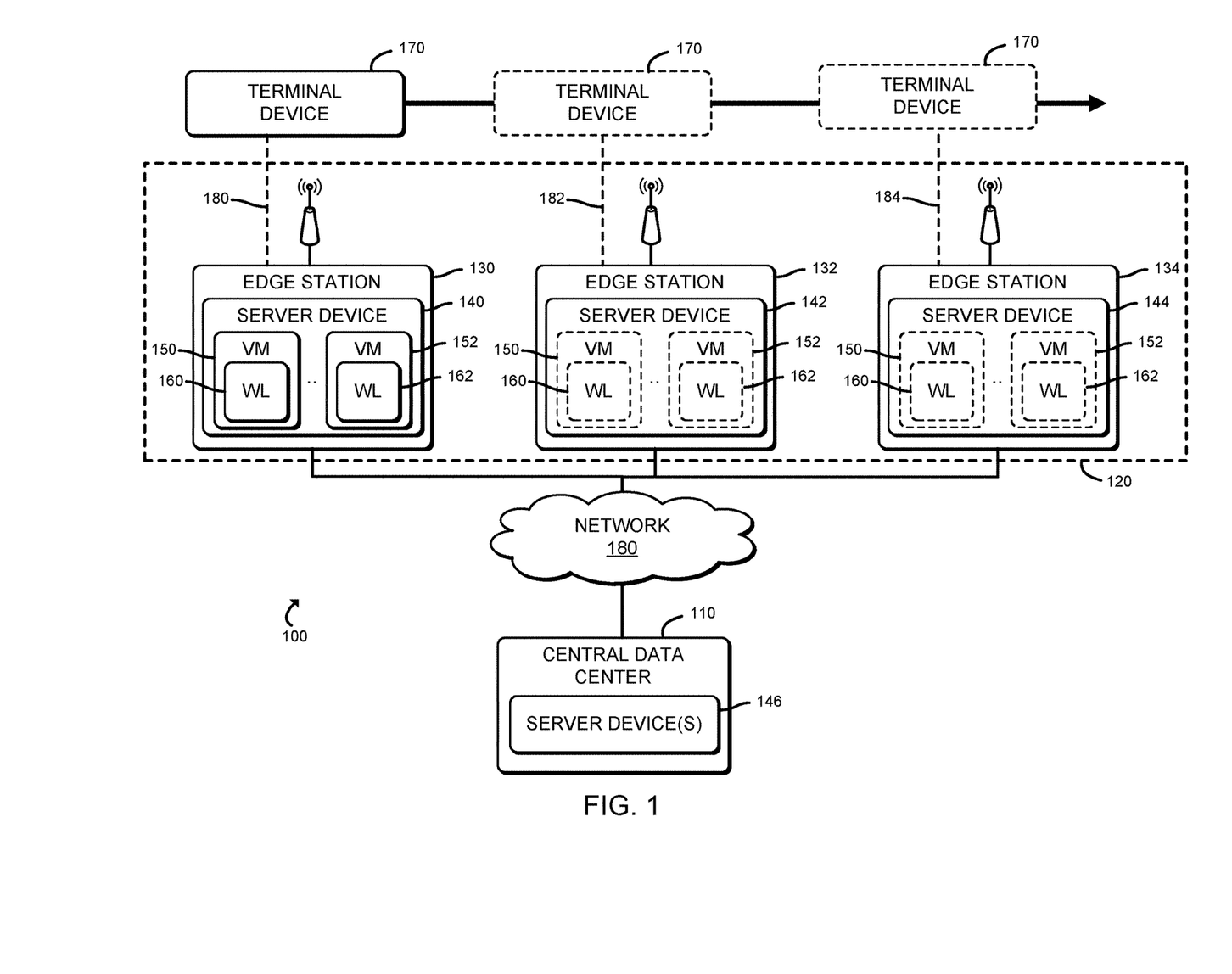
FIG. 1 is a simplified diagram of at least one embodiment of a system for providing efficient migration of services between edge stations located at a cloud edge.

Referring now to FIG. 1, a system 100 for providing efficient migration of services between edge stations (e.g., a small cell, a base station, etc.) located the edge (e.g., in an edge network) of a cloud includes a central data center 110 communicatively coupled to multiple edge stations 130, 132, and 134. An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/ processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, multi-access edge computing (MEC) appliances, etc. It should be appreciated that, in some embodiments, the edge network may form a portion of or otherwise provide an ingress point into a fog network, which may be embodied as a system-level horizontal architecture that distributes resources and services of computing, storage, control and networking anywhere between the central data center 110 and an endpoint device (e.g., the terminal device 170).

The central data center 110 may be embodied as a data center (e.g., a cloud data center) in a higher level of a hierarchy of the system 100 than the edge stations 130, 132, 134 and that includes multiple server devices 146 capable of executing one or more services (e.g., on behalf of a client device). Each edge station 130, 132, and 134 may be embodied as a data center that includes one or more server devices 140, 142, 144 similar to the server devices 146 in the central data center 110. The central data center 110 and the edge stations 130, 132, 134 collectively define a cloud (e.g., a group of server devices capable of performing services on behalf of a client device), with the edge stations 130, 132, 134 located at the edge 120 (e.g., the perimeter) of the cloud.

A terminal device 170 (e.g., a client device such as a smartphone, a vehicle infotainment system, etc.) may, in operation, travel along an edge of the cloud and temporarily communicate with one edge station (e.g., the edge station 130) before losing connectivity (e.g., by leaving a wireless communication range of the edge station 130, by disconnecting from a wired network connection 180, etc.) of the edge station 130 and establishing connectivity with of another edge station 132 (e.g., by entering a wireless communication range of the edge station 132, by connecting to a wired network connection 182). As the terminal device 170 continues to travel, the terminal device 170 may disconnect from the edge station 132 and connect with yet another edge station 134 (e.g., by entering a wireless communication range of the edge station 134, by connecting to a wired network connection 184), and so on. In the illustrative embodiment, one or more server devices 140, 142, 144 in each edge station 130, 132, 134 is configured to execute workloads 160, 162 (e.g., services) on behalf of the terminal device 170. For example, the server device 140 may provide an autonomous vehicle control service (e.g., object recognition, steering, acceleration, and brake control), a mapping service (e.g., a route finding service), and a music streaming service for the terminal device 170. As the terminal device 170 leaves the communication range of the edge station 130 or otherwise continues to travel such that connectivity with the edge station 130 will be lost (e.g., within a predefined amount of time), the server device 140 pauses execution of the services and sends the data utilized by the services through a high speed network connection to the server device 142 of the next edge station 132.

Subsequently, the server device 142 of that edge station 132 executes the services on behalf of the terminal device 170. In the illustrative embodiment, the server devices 140, 142, 144 may execute the services in virtual machines 150, 152 or containers (e.g., each a set of data and software, such as files, environment variable, and libraries, needed to execute a given service). Further, the server devices 140, 142, 144 may determine a prioritization of the services and migrate the services according to their prioritization (e.g., migrating the presently unused services before the services that are presently in use, etc.). Additionally, in the illustrative embodiment, to reduce the latency that would result if the migration of the services was performed in software, the migration is instead performed in hardware (e.g., with a specialized migration accelerator logic unit 222 in each server device 140, 142, 144). As such, as compared to typical cloud systems in which a client device communicates with a centralized cloud data center or a single location along the edge of the cloud, the system 100 provides low-latency service across multiple locations along the edge of the cloud, enabling a user of the client device (e.g., the terminal device 170) to travel without experiencing a diminished quality of service (e.g., increased latency, an unreliable connection, etc.).

Figure 2:
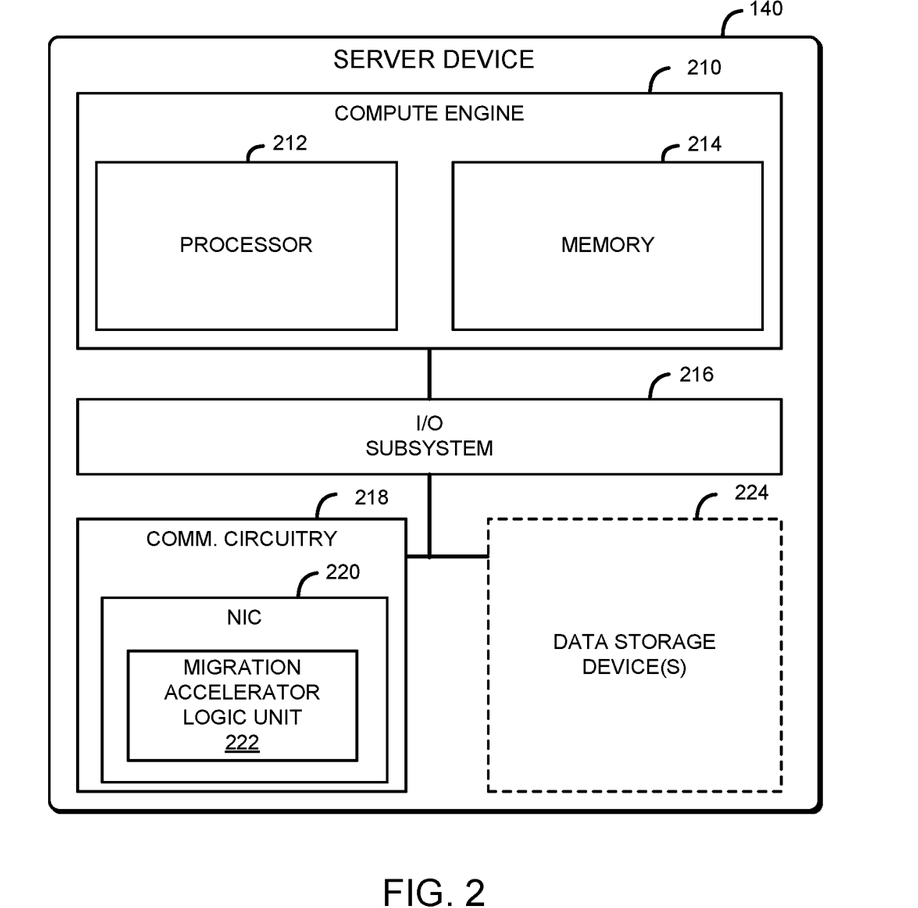
FIG. 2 is a simplified block diagram of at least one embodiment of a server device included in the system of FIG. 1.

Referring now to FIG. 2, the illustrative server device 140 includes a compute engine (also referred to herein as "compute engine circuitry") 210, an input/output (I/O) subsystem 216, communication circuitry 218, and one or more data storage devices 224. Of course, in other embodiments, the server device 140 may include other or additional components, such as those commonly found in a computer (e.g., a display, peripheral devices, etc.). Additionally, in some embodiments, one or more of the illustrative components may be incorporated in, or otherwise form a portion of, another component. Further, in some embodiments, one or more of the components may be any distance away from another component of the server device 140 and, the server device 140, while illustrated as a singular device, may comprise multiple named server devices functioning as one unit. The various named server devices making up the server device 140 may be connected in a fog network arrangement. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3

SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as workloads (also referred to herein as services), data operated on by the workloads, libraries, and drivers.

The compute engine 210 is communicatively coupled to other components of the server device 140 via the I/O subsystem 216, which may be embodied as circuitry and/or components to facilitate input/output operations with the compute engine 210 (e.g., with the processor 212 and/or the main memory 214) and other components of the server device 140. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the server device 140, into the compute engine 210.

The communication circuitry 218 may be embodied as any communication circuit, device, or collection thereof, capable of enabling communications over the network 180 between the server device 140 and another compute device (e.g., the terminal device 170, the server devices 142, 144, 146, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the server device 140 to connect with another compute device (e.g., the terminal device 170, the server devices 142, 144, 146, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the server device 140 at the board level, socket level, chip level, and/or other levels. In the illustrative embodiment, the NIC 220 includes a migration accelerator logic unit (also referred to herein as "migration accelerator circuitry") 222 which may be embodied as any device or circuitry (e.g., a field programmable gate array (FPGA), an application specific integrated circuit (ASIC), a co-processor, etc.) configured to manage the migration of services from the server device 140 to a server device of another edge station (e.g., the server device 142 of the edge station 132) on an as needed basis (e.g., when the terminal device 170 has exceeded a predefined range of the edge station 130). As such, in the illustrative embodiment, the migration accelerator logic unit 222 is configured to determine whether execution of the services (e.g., the workloads 160, 162) is to be migrated from the edge station 130 in which the present server device 140 is located to another edge station (e.g., the edge station 132) in which another server device (e.g., the server device 142) is located, determine a prioritization of the services executed by the server device 140, and send, in response to a determination that the services are to be migrated and as a function of the determined prioritization, data utilized by each service to the server device 142 of the other edge station 132 to migrate the services.

The one or more illustrative data storage devices 224 may be embodied as any type of devices configured for short-term or long-term storage of data such as, for example, memory devices and circuits, memory cards, hard disk drives, solid-state drives, or other data storage devices. Each data storage device 224 may include a system partition that stores data and firmware code for the data storage device 224. Each data storage device 224 may also include one or more operating system partitions that store data files and executables for operating systems.

The server devices 142, 144, 146 and the terminal device 170 may have components similar to those described in FIG. 2 with reference to the server device 140. The description of those components of the server device 140 is equally applicable to the description of components of the server devices 142, 144, 146 and the terminal device 170, with the exception that, in some embodiments, the migration accelerator logic unit 222 is not included in the communication circuitry of the terminal device 170 and/or the server device 146. Further, it should be appreciated that any of the server devices 140, 142, 144, 146 and the terminal device 170 may include other components, sub-components, and devices commonly found in a computing device, which are not discussed above in reference to the server device 140 and not discussed herein for clarity of the description.

As described above, the servers devices 140, 142, 144, 146 and the terminal device 170 are illustratively in communication via the network 180, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), such as at the cloud edge 120, digital subscriber line (DSL) networks, cable networks (e.g., coaxial networks, fiber networks, etc.), or any combination thereof.

Figure 3:
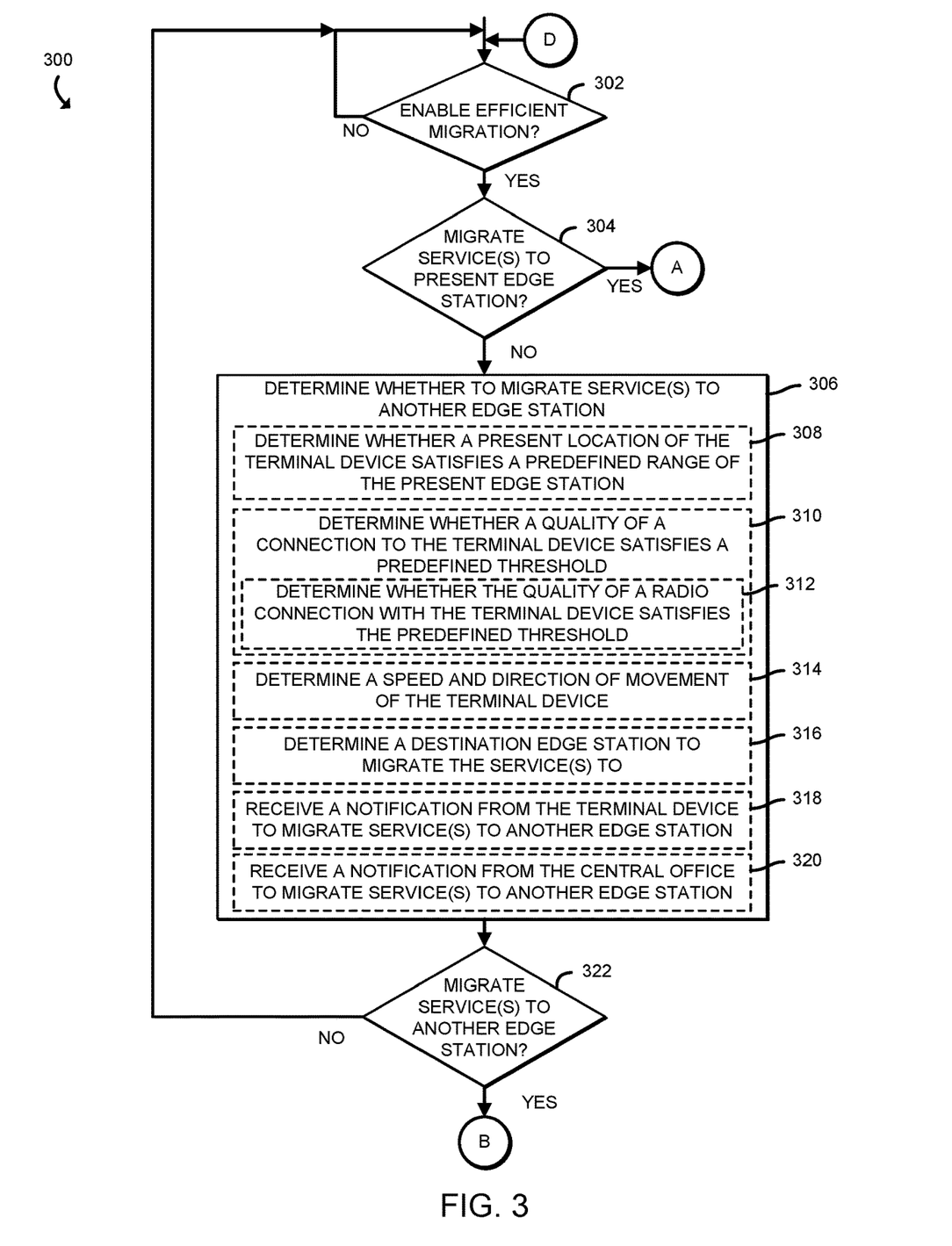
FIGS. 3-6 are a simplified block diagram of at least one embodiment of a method for providing efficient migration of services at a cloud edge that may be performed by a server device of FIGS. 1 and 2.
Figure 4:
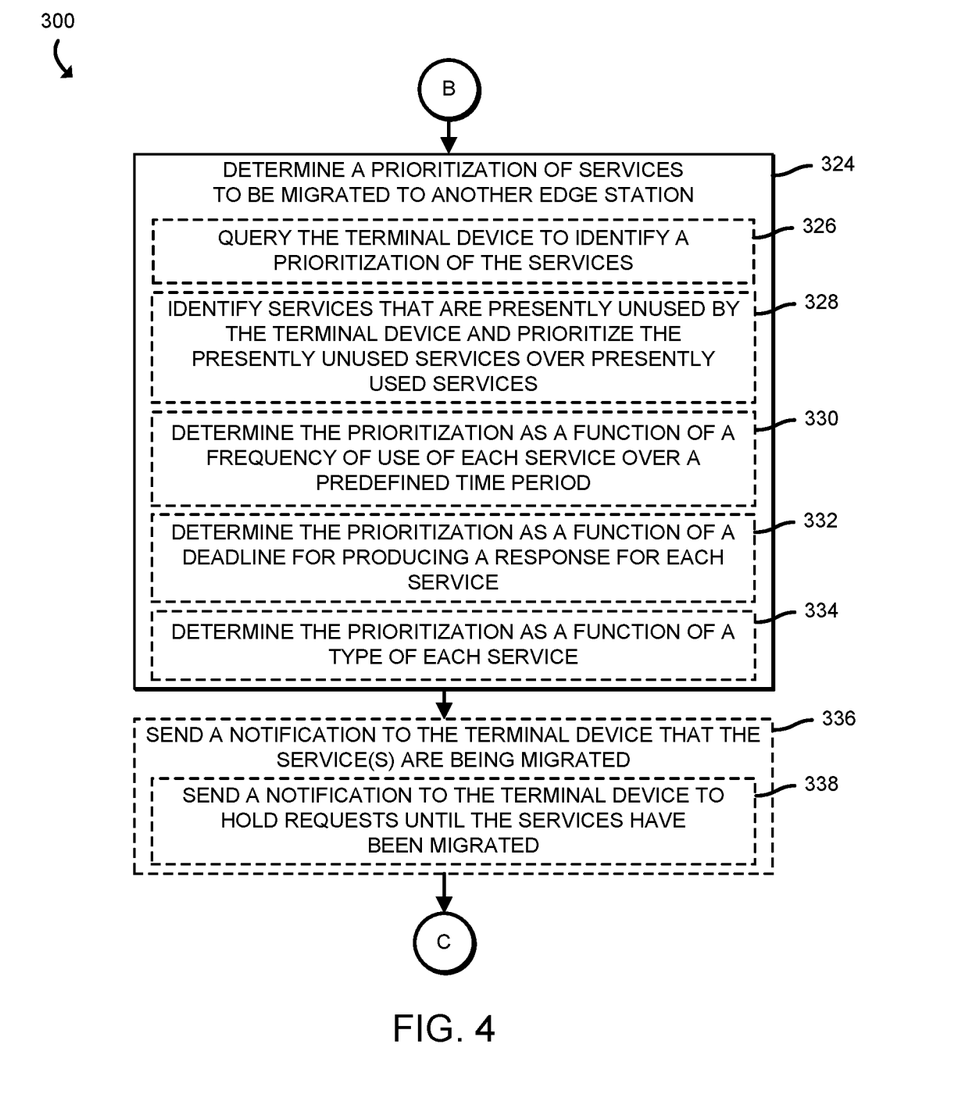

Referring now to FIG. 3, the server device 140, in operation, may execute a method 300 for providing efficient migration of services at a cloud edge (e.g., between edge stations). The method 300 begins with block 302, in which the server device 140 determines whether to enable efficient migration of services. In the illustrative embodiment, the server device 140 may determine to enable efficient migration in response to determining that the server device 140 is equipped with the migration accelerator logic unit 222 (e.g., by querying the NIC 220 to determine whether the NIC 220 includes the migration accelerator logic unit 222). In other embodiments, the server device 140 may determine whether to enable efficient migration based on other factors. Regardless, in response to a determination to enable efficient migration, the method 300 advances to block 304 in which the server device 140 determines whether to migrate one or more services to the present edge station (e.g., the edge station 130). In the illustrative embodiment, the server device 140 determines to migrate one or more services to the present edge station 130 if a terminal device (e.g., the terminal device 170) has entered a predefined range (e.g., a range in which a cellular tower associated with the edge station is able to communicate with the terminal device 170) of the present edge station 130 and/or in response to a request from another device (e.g., from a server device 142, 144 of another edge station 132, 134, from a server device 146 of the central data center 110, and/or from the terminal device 170) to migrate the service(s). In other embodiments, the server device 140 may determine to migrate one or more services to the present edge station 130 based on other factors. Regardless, in response to a determination not to migrate any services to the present edge station 130, the method 300 advances to block 306 in which the server device 140 determines whether to migrate one or more services (e.g., the workloads 160, 162) to another edge station (e.g., the edge station 132). In doing so, the server device 140 may determine whether a present position of the terminal device 170 satisfies a predefined range of the present edge station, as indicated in block 308. For example, the server device 140 may determine the present position of the terminal device 170 from one of the services (e.g., the application 160, which may be an autonomous vehicle control service or a route finding service), by querying the terminal device 170 for its position, and/or from another source, compare the position to the position of the edge station 130, which may be stored in the memory 214 or a data storage device 224, and determine whether the distance between the two positions is greater than or equal to a predefined distance (e.g., 30 miles). As indicated in block 310, the server device 140 may determine whether a quality (e.g., ratio of dropped packets to received packets, a latency, etc.) of a connection to the terminal device 170 satisfies a predefined threshold. In doing so, and as indicated in block 312, the terminal device 170 determines, in the illustrative embodiment, whether the quality of a radio connection (e.g., a radio connection between a cellular tower associated with the edge station 130 and the terminal device 170) satisfies the predefined threshold.

The server device 140 may additionally determine the speed and direction of movement of the terminal device 170 as indicated in block 314, and based on that information, determine which edge station (e.g., the edge station 132) the terminal device 170 is moving towards and when the terminal device 170 will be within a predefined range of that edge station (e.g., the destination edge station to migrate the services to), as indicated in block 316. In some embodiments, the terminal device 170 may instead perform one or more of the above determinations and the server device 140 may receive a notification from the terminal device 170 that indicates that the services should be migrated to another edge station (e.g., the edge station 132), as indicated in block 318. Additionally or alternatively, as indicated in block 320, the server device(s) 146 may receive a notification from the central data center 110 to migrate the services to another edge station (e.g., the central data center 110 may perform one or more of the above determinations and send the corresponding notification to the server device 140 in response to determining that the services should be migrated). In some embodiments, the server device 140 may determine to perform a migration to one or more other edge stations speculatively (e.g., to copy data utilized by the services to other edge stations to enable nearly instantaneous resumption of the services at one of those edge stations if the terminal device 170 subsequently happens to enter predefined range of one of those edge stations). In block 322, the server device 140 determines the subsequent course of action based on the determination made in block 306. If the determination is not to migrate one or more services to another edge station, the method 300 loops back to block 302 to determine whether to continue to enable efficient migration of services. Otherwise, the method 300 advances to block 324 of FIG. 4 in which the server device 140, in the illustrative embodiment, determines a prioritization of the services to be migrated to the other edge station (e.g., the edge station 132).

Referring now to FIG. 4, in determining the prioritization, the server device 140 may query the terminal device 170 to identify the prioritization of the services (e.g., the terminal device 170 may provide data indicative of the prioritization of the services), as indicated in block 326. In some embodiments, the server device 140 may identify services that are presently unused by the terminal device 170 (e.g., the server device 140 has not performed any operations related to those services or communicated any data related to those services within a predefined time period) and prioritize those unused services over services that are presently being used by the terminal device 170, as indicated in block 328. Similarly, in some embodiments, the terminal device 170 may determine the prioritization as a function of a frequency of use of each service over a predefined time period (e.g., by prioritizing less frequently used services over more frequently used services or vice versa), as indicated in block 330. As indicated in block 332, the server device 140 may determine the prioritization as a function of a deadline for producing a response to the terminal device 170 for each service. As such, the server device 140 may prioritize those services having a later deadline over those having an earlier deadline, or vice versa.

In some embodiments, as indicated in block 334, the server device 140 may determine the prioritization as a function of the type of each service (e.g., according to a table or other data structure in memory that associates types of services, such as autonomous vehicle control, route finding, and/or music streaming to corresponding prioritizations). As indicated in block 336, the server device 140 may send a notification to the terminal device 170 that the services are being migrated. In doing so, and as indicated in block 338, the server device 140 may send a notification that instructs the terminal device 170 to hold any further requests associated with one or more of the services until the services have been migrated to the destination edge station (e.g., the edge station 132). Subsequently, the method 300 advances to block 340 of FIG. 5, in which the server device 140 migrates the services to the destination edge station (e.g., the edge station 132).

Figure 5:
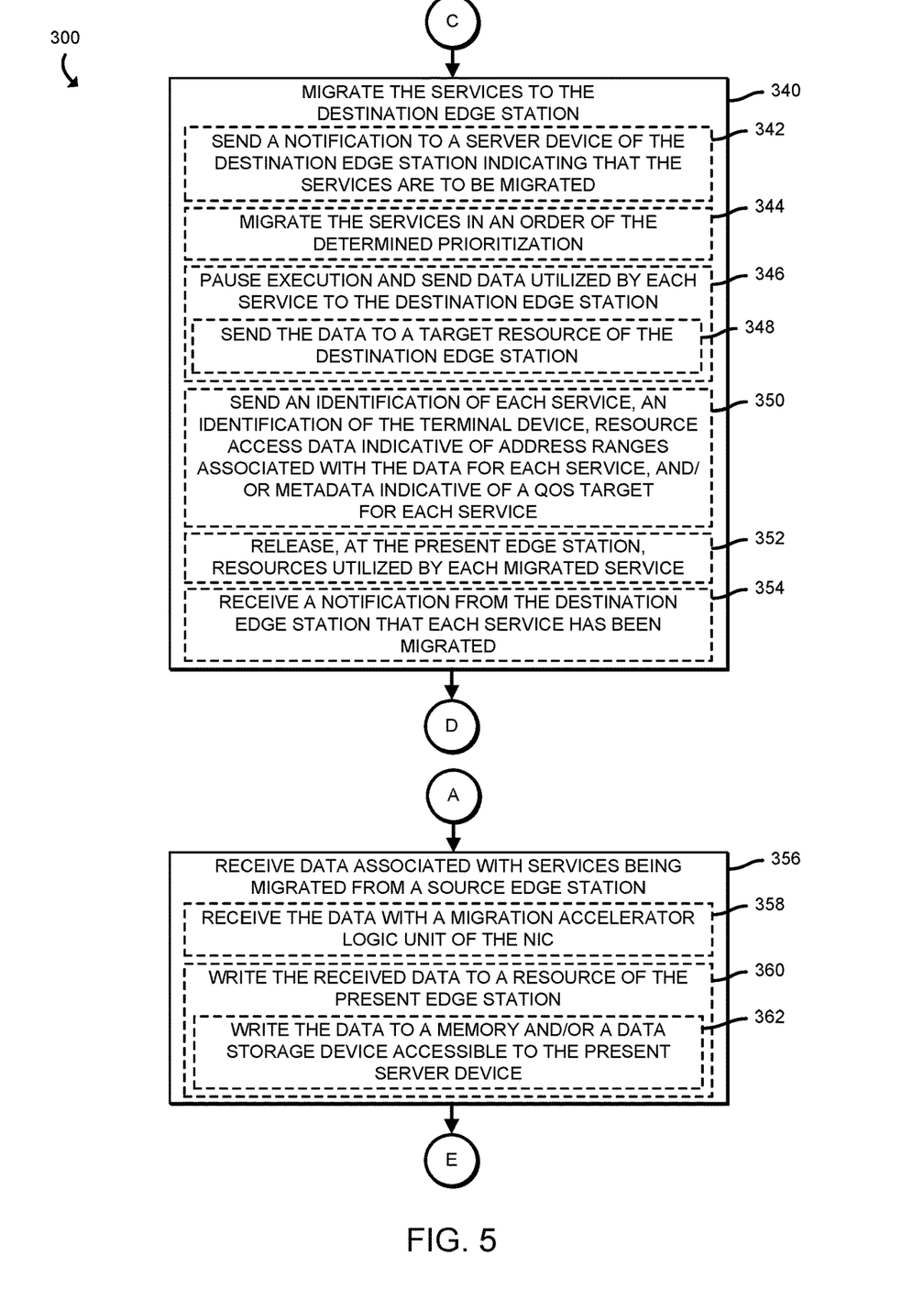

Referring now to FIG. 5, in migrating the services to the destination edge station (e.g., the edge station 132), the server device 140 may send, to a server device (e.g., the server device 142) of the destination edge station 132, a notification indicating that the services are to be migrated, as indicated in block 342. Further, as indicated in block 344, in the illustrative embodiment, the server device 140 migrates the services to the destination edge station 132 in the order of the prioritization determined in block 324 of FIG. 4. Additionally, in the illustrative embodiment, for each service to be migrated, the server device 140 pauses execution of the service and sends data (e.g., in the memory 214 and/or the data storage device(s) 224) utilized by the service to the destination edge station 132, as indicated in block 346. As such, in the illustrative embodiment, the server device 140 pauses a higher priority service and sends the data utilized by the higher priority service to the server device 142 at the destination edge station 132 while a lower priority service continues to execute, and subsequently performs the pausing of execution and sending of data for the lower priority service. In embodiments in which the server device 140 speculatively sends the data to one or more other edge stations, the server device 140 may not pause execution of any of the services until it is later determined that the terminal device 170 has entered a predefined range (e.g., a communication range) of one of the edge stations (e.g., the edge station 132) to which the data was speculatively copied. The server device 140 may specify a particular resource (e.g., memory or a data storage device) available at the destination edge station (e.g., included in the server device 142) to which the data should be stored, as indicated in block 348.

As indicated in block 350, the server device 140 may send, to the server device 142 at the destination edge station 132 an identification (e.g., a unique identifier, an application name, etc.) of each service being migrated, an identification of the terminal device (e.g., an Internet Protocol (IP) address, a Media Access Control (MAC) address, etc.), resource access data which may be embodied as any data indicative of address ranges associated with the data for each service (e.g., memory address ranges for each data structure within the sent data, memory address ranges where the data is to be stored in the memory at the server device 142, etc.), and/or metadata which may be embodied as any data indicative of a quality of service target (e.g., a latency, a bandwidth, etc.) to be satisfied in the execution of each service. In some embodiments, the quality of service target may be defined in a service level agreement (SLA) which may be sent by the server device 140 to the server device 142. As indicated in block 352, in the illustrative embodiment, the server device 140 additionally releases, at the present edge station 130, the resources that were utilized by each migrated service. In some embodiments, the server device 140 may additionally receive a notification from the server device 142 at the destination edge station 132 that each service was successfully migrated, as indicated in block 354. Subsequently, the method 300 loops back to block 302 of FIG. 3, in which the server device 140 determines whether to continue to enable efficient migration of services.

Referring back to block 304 of FIG. 3, if the server device 140 instead determines that a set of services are to be migrated to the present edge station 130 (e.g., to the server device 140), the method 300 advances to block 356 of FIG. 5, in which the server device 140 receives data associated with the services being migrated from a source edge station (e.g., from the edge station 132 if the terminal device 170 is moving from the edge station 132 to the edge station 130). In doing so, and as indicated in block 358, the server device 140 receives the data with the migration accelerator logic unit 222, and writes the received data to a corresponding resource of the present edge station 130 (e.g., of the server device 140), as indicated in block 360. For example, and as indicated in block 362, the migration accelerator logic unit 222 may write the data to a particular memory range of the memory 214 through direct memory access (DMA) and/or may write data to one or more data storage devices 224. Subsequently, the method 300 advances to block 364 of FIG. 6, in which the server device 140 executes the migrated services. In doing so, and as indicated in block 366, the server device 140 resumes the services in an order of a prioritization of the services (e.g., according to a prioritization determined by the server device 142 that sent the data). For example, and as indicated in block 368, the server device 140 resumes the services in the order in which the server device 140 received the data (e.g., from the server device 142) for the services.

Figure 6:
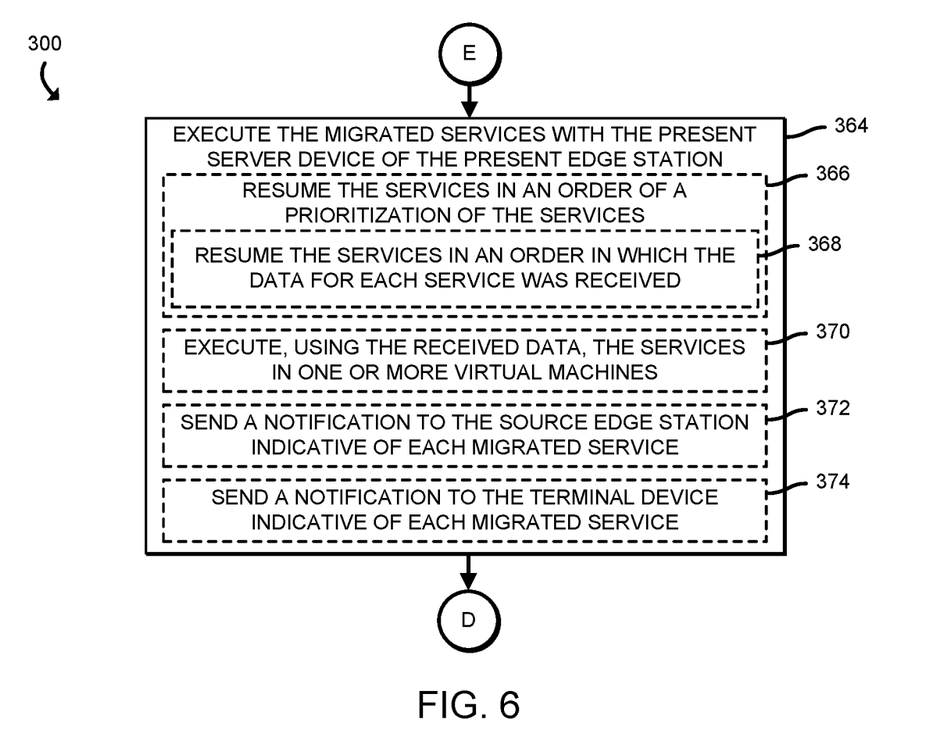

In the illustrative embodiment, and as indicated in block 370, the server device 140 executes, using the received data, the services in one or more virtual machines (e.g., the workloads 160, 162 in corresponding virtual machines 150, 152). Each virtual machine 150, 152 may be embodied as an emulation of a computer system (e.g., implemented in software and/or specialized hardware) that provides functionality needed to execute an entire operating system, thereby enabling the server device 140 to appear, to the software (e.g., workloads 160, 162), as multiple separate computer systems, each with its own operating system and hardware resources (e.g., memory resources, compute resources, etc.). Through virtualization, the capacity of the components of the server device 140 may be dynamically partitioned among multiple customers (e.g., each receiving services through the operations of one or more corresponding virtual machines 150, 152). As indicated in block 372, the server device 140 sends, to the source edge station (e.g., to the server device 142 of the edge station 132), a notification indicative of each migrated service (e.g., an identifier of each service that has been migrated). Additionally or alternatively, the server device 140 may send, to the terminal device 170, a notification indicative of each service that has been migrated (e.g., to prompt the terminal device 170 to send any requests that the terminal device 170 was holding until the migration completed). Subsequently, the method 300 loops back to block 302 of FIG. 3 in which the server device 140 determines whether to continue to enable efficient migration of services.

Figure 7:
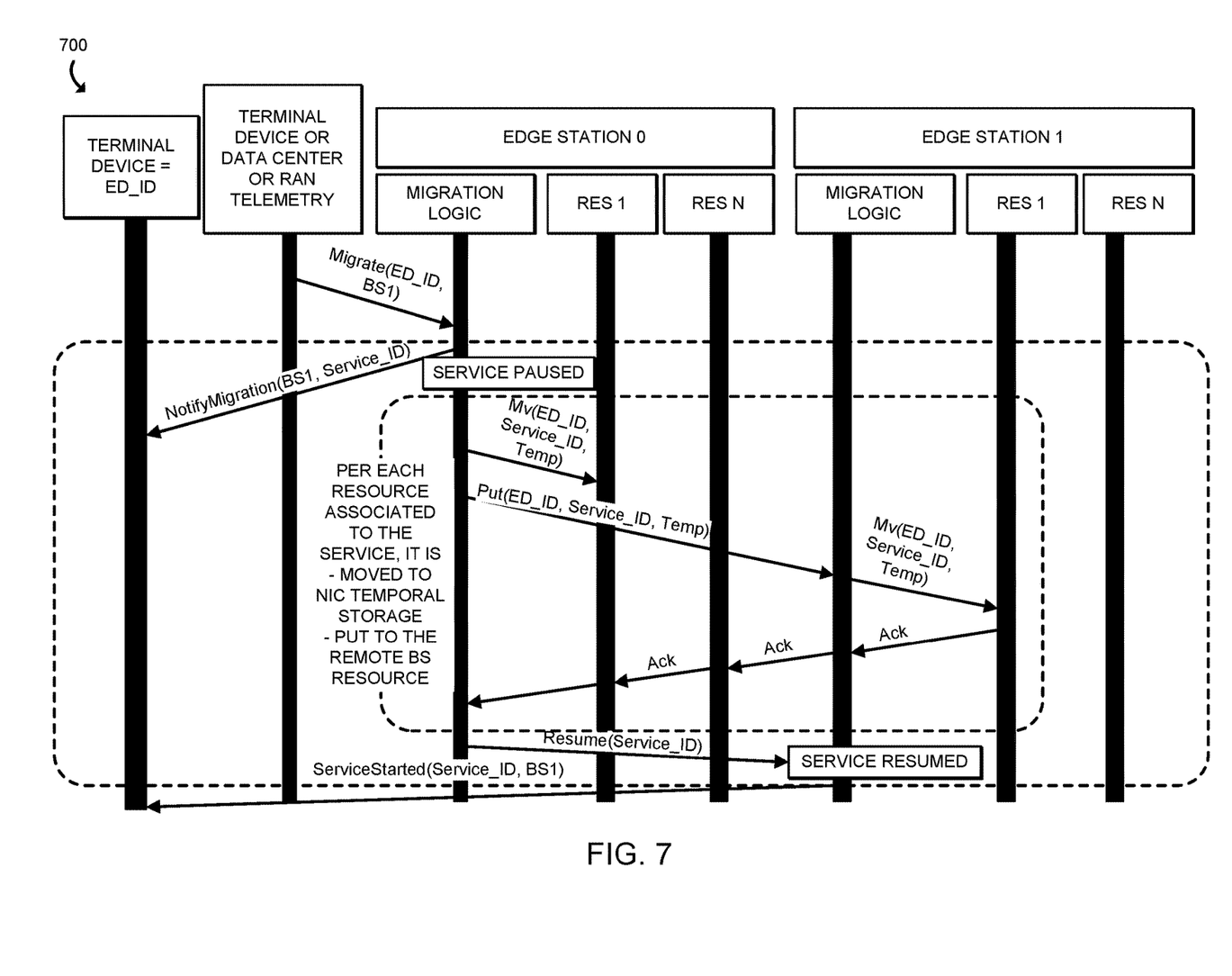
FIG. 7 is a simplified block diagram of at least one embodiment of a flow of data communications sent between components of the system of FIG. 1 to perform an efficient migration of services at a cloud edge.

Referring now to FIG. 7, a flow 700 of data communications sent between components of the system of FIG. 1 to perform an efficient migration of services at a cloud edge is shown. Initially, an edge station (e.g., the edge station 130) determines to migrate one or more services to another edge station. For example, migration logic (e.g., the migration accelerator logic unit 222) of the server device 140 may receive a message from the terminal device 170 or the central data center 110 to perform the migration, or the migration accelerator logic unit 222 may determine, from telemetry data indicative of a quality of a connection (e.g., through a radio access network) with the terminal device 170, whether the quality satisfies a predefined threshold. In response, the migration accelerator logic unit 222 sends a notification to the terminal device 170 that one or more services are being migrated. Further, the server device 140 pauses execution of the service(s) and sends, to the migration logic unit of another server device (e.g., the server device 142) in the destination edge station (e.g., the edge station 132) data utilized by each service. The migration accelerator logic unit 222 in the server device 142 moves (e.g., writes) the data to a corresponding resource (e.g., memory, data storage, etc.) of the server device 142 and sends an acknowledgement notification back to the migration accelerator logic unit 222 of the server device 140. Subsequently, the migration accelerator logic unit 222 sends a request to the migration accelerator logic unit of the server device 142 to resume execution of the service(s). In response, the server device 142 resumes execution of the service(s) and sends a notification to the terminal device 170 indicating that the service(s) have been resumed (e.g., successfully migrated).

Figure 8:
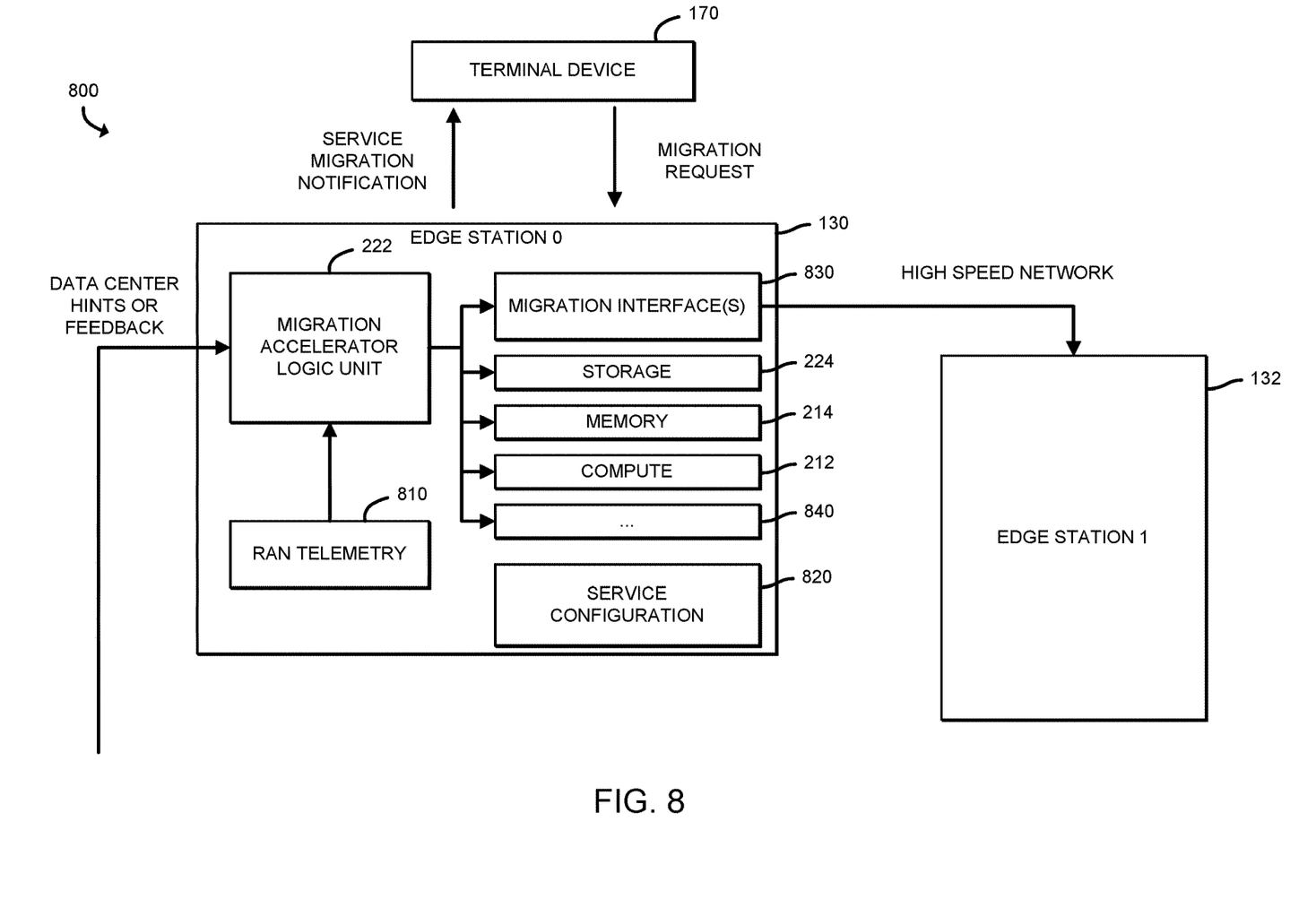
FIG. 8 is a simplified block diagram of at least one embodiment of an architecture of the system of FIG. 1.

Referring now to FIG. 8, in at least some embodiments of the architecture 800 of the system 100, an edge station (e.g., the edge station 130) includes the migration accelerator logic unit 222, which is connected to the one or more storage devices 224, memory 214, and the processor 212 described with reference to FIG. 2. Those resources 212, 214, 224 may be distributed across multiple racks within the edge station 130 or included in the same server device 140. The migration accelerator logic unit 222 may also be connected to other resources 840, such as acceleration devices which may be embodied as any device or circuitry (e.g., an FPGA, an ASIC, reconfigurable circuitry, etc.) configured to increase the speed (e.g., as compared to a general purpose processor) at which a set of operations are performed. The migration accelerator logic unit 222 is also connected to one or more migration interfaces (e.g., similar to the communication circuitry 218) to enable the edge station 130 to send and receive data utilized by the services. The migration accelerator logic unit 222 may receive radio access network (RAN) telemetry data 810 indicative of a quality of a connection between the edge station 130 and the terminal device 170, which, as described with reference to block 310 of FIG. 3, may be used to determine whether to migrate services to another edge station (e.g., the edge station 132). Additionally or alternatively, the migration accelerator logic unit 222 may receive data from the central data center 110 such as hints or feedback (e.g., data indicating that a migration to another edge station should be performed), as described with reference to block 320 of FIG. 3. Additionally, the edge station 130 (e.g., one or more server devices 140 of the edge station 130), in the illustrative embodiment, utilizes service configuration data 820 which may be embodied as any data indicative of an identifier of each terminal device 170 for which the edge station is executing services, an identifier of each service executed for each terminal device 170, an identification of data utilized by each service, and metadata indicative of quality of service target(s) to be satisfied in the execution of each corresponding service.

EXAMPLES

Illustrative examples of the technologies disclosed herein are provided below. An embodiment of the technologies may include any one or more, and any combination of, the examples described below.

Example 1 includes a server device comprising compute engine circuitry to execute a set of services on behalf of a terminal device; and migration accelerator circuitry to determine whether execution of the services is to be migrated from an edge station in which the present server device is located to a second edge station in which a second server device is located; determine a prioritization of the services executed by the server device; and send, in response to a determination that the services are to be migrated and as a function of the determined prioritization, data utilized by each service to the second server device of the second edge station to migrate the services.

Example 2 includes the subject matter of Example 1, and wherein to determine whether execution of the services is to be migrated comprises to determine whether a quality of a connection to the terminal device satisfies a predefined threshold.

Example 3 includes the subject matter of any of Examples 1 and 2, and wherein the migration accelerator circuitry is further to determine the identity of the second edge station as a function of a direction of movement of the terminal device.

Example 4 includes the subject matter of any of Examples 1-3, and wherein to determine whether execution of the services is to be migrated comprises to receive a notification from the terminal device or a central data center that the services are to be migrated.

Example 5 includes the subject matter of any of Examples 1-4, and wherein the compute engine circuitry is further to pause execution of a service before the data utilized by the service is sent to the second server device.

Example 6 includes the subject matter of any of Examples 1-5, and wherein to send the data comprises to send the data to a target resource accessible by the second server device.

Example 7 includes the subject matter of any of Examples 1-6, and wherein the migration accelerator circuitry is further to send, to the second server device, resource access data indicative of an address range associated with the data sent for each service.

Example 8 includes the subject matter of any of Examples 1-7, and wherein the migration accelerator circuitry is further to send, to the second server device, metadata indicative of a quality of service target associated with each service.

Example 9 includes the subject matter of any of Examples 1-8, and wherein the compute engine circuitry is further to release, after a service has been migrated to the second compute device, one or more resources that were utilized by the service before the service was migrated.

Example 10 includes the subject matter of any of Examples 1-9, and wherein the migration accelerator circuitry is further to receive, from a third server device of a third edge station, data associated with a service to be migrated to the server device.

Example 11 includes the subject matter of any of Examples 1-10, and wherein the migration accelerator circuitry is further to write the received data to a resource that is accessible to the server device.

Example 12 includes the subject matter of any of Examples 1-11, and wherein the compute engine circuitry is further to execute, in response to receipt of the data, the migrated service in a virtual machine.

Example 13 includes the subject matter of any of Examples 1-12, and wherein to determine the prioritization comprises to prioritize services that have been unused by the terminal device over services that have been used by the terminal device within a predefined time period of the determination of whether execution of the services is to be migrated.

Example 14 includes the subject matter of any of Examples 1-13, and wherein the migration accelerator circuitry comprises one or more of a field programmable gate array (FPGA) or an application specific integrated circuit (ASIC).

Example 15 includes a method comprising executing, by a server device, a set of services on behalf of a terminal device; determining, by the server device, whether execution of the services is to be migrated from an edge station in which the present server device is located to a second edge station in which a second server device is located; determining, by the server device, a prioritization of the services executed by the server device; and sending, by the server device and in response to a determination that the services are to be migrated and as a function of the determined prioritization, data utilized by each service to the second server device of the second edge station to migrate the services.

Example 16 includes the subject matter of Example 15, and wherein determining whether execution of the services is to be migrated comprises determining whether a quality of a connection to the terminal devices satisfies a predefined threshold.

Example 17 includes the subject matter of any of Examples 15 and 16, and further including determining, by the server device, the identity of the second edge station as a function of a direction of movement of the terminal device.

Example 18 includes the subject matter of any of Examples 15-17, and wherein determining whether execution of the services is to be migrated comprises receiving a notification from the terminal device or a central data center that the services are to be migrated.

Example 19 includes the subject matter of any of Examples 15-18, and further including pausing execution of a service before the data utilized by the service is sent to the second server device.

Example 20 includes the subject matter of any of Examples 15-19, and wherein sending the data comprises sending the data to a target resource accessible by the second server device.

Example 21 includes the subject matter of any of Examples 15-20, and further including sending, to the second server device, resource access data indicative of an address range associated with the data sent for each service.

Example 22 includes the subject matter of any of Examples 15-21, and further including sending, to the second server device, metadata indicative of a quality of service target associated with each service.

Example 23 includes the subject matter of any of Examples 15-22, and further including releasing, after a service has been migrated to the second compute device, one or more resources that were utilized by the service before the service was migrated.

Example 24 includes one or more machine-readable storage media comprising a plurality of instructions stored thereon that, in response to being executed, cause a server device to perform the method of any of Examples 15-23.

Example 25 includes a server device comprising means for performing the method of any of Examples 15-23.

What is claimed is:

1. A server device comprising:
   compute engine circuitry to execute a set of services on behalf of a terminal device; and
   migration accelerator circuitry to:
   determine whether execution of the services is to be migrated from an edge station in which the server device is located to a second edge station in which a second server device is located;
   determine a prioritization of the services executed by the server device;
   cause the terminal device to hold requests for services by sending, to the terminal device, a migration notification message; and
   send, in response to a determination that the services are to be migrated and as a function of the determined prioritization, data utilized by each service to the second server device of the second edge station to migrate the services.

2. The server device of claim 1, wherein the migration accelerator circuitry is to determine whether a quality of a connection to the terminal device satisfies a predefined threshold.

3. The server device of claim 1, wherein the migration accelerator circuitry is further to determine the identity of the second edge station as a function of a direction of movement of the terminal device.

4. The server device of claim 1, wherein the migration accelerator circuitry is to receive a notification from the terminal device or a central data center that the services are to be migrated.

5. The server device of claim 1, wherein the compute engine circuitry is further to pause execution of a service before the data utilized by the service is sent to the second server device.

6. The server device of claim 1, wherein the migration accelerator circuitry is to:
   send the data to a target resource accessible by the second server device; and
   send, to the second server device, resource access data indicative of an address range associated with the data sent for each service.

7. The server device of claim 1, wherein the migration accelerator circuitry is further to send, to the second server device, metadata indicative of a quality of service target associated with each service.

8. The server device of claim 1, wherein the compute engine circuitry is further to release, after a service has been migrated to the second compute server device, one or more resources that were utilized by the service before the service was migrated.

9. The server device of claim 1, wherein the migration accelerator circuitry is further to:
   receive, from a third server device of a third edge station, data associated with a service to be migrated to the server device; and
   write the received data to a resource that is accessible to the server device.

10. A method comprising:
    executing, by executing instructions by a server device, a set of services on behalf of a terminal device;
    determining, by executing instructions by the server device, whether execution of the services is to be migrated from an edge station in which the server device is located to a second edge station in which a second server device is located;

determining, by executing instructions by the server device, a prioritization of the services executed by the server device;

holding, by executing instructions by the server device, requests for services by sending, to the terminal device, a migration notification message; and sending, by executing instructions by the server device and in response to a determination that the services are to be migrated and as a function of the determined prioritization, data utilized by each service to the second server device of the second edge station to migrate the services.

11. The method of claim 10, wherein determining whether execution of the services is to be migrated includes determining whether a quality of a connection to the terminal device satisfies a predefined threshold.

12. The method of claim 10, further comprising including determining, by the server device, the identity of the second edge station as a function of a direction of movement of the terminal device.

13. The method of claim 10, wherein determining whether execution of the services is to be migrated includes receiving a notification from the terminal device or a central data center that the services are to be migrated.

14. The method of claim 10, further including pausing execution of a service before the data utilized by the service is sent to the second server device.

15. The method of claim 10, wherein sending the data includes sending the data to a target resource accessible by the second server device, and sending, to the second server device, resource access data indicative of an address range associated with the data sent for each service.

16. The method of claim 10, further including sending, to the second server device, metadata indicative of a quality of service target associated with each service.

17. The method of claim 10, further including releasing, after a service has been migrated to the second server device, one or more resources that were utilized by the service before the service was migrated.

18. One or more machine-readable storage devices comprising a plurality of instructions stored thereon that, when executed, cause a server device to:

execute a set of services on behalf of a terminal device;

determine whether execution of the services is to be migrated from an edge station in which the server device is located to a second edge station in which a second server device is located;

determine a prioritization of the services executed by the server device;

cause the terminal device to hold requests for services by sending, to the terminal device, a migration notification message; and send, in response to a determination that the services are to be migrated and as a function of the determined prioritization, data utilized by each service to the second server device of the second edge station to migrate the services.

19. The one or more machine-readable storage devices of claim 18, wherein to determine whether execution of the services is to be migrated includes determining whether a quality of a connection to the terminal device satisfies a predefined threshold.

20. The one or more machine-readable storage devices of claim 18, wherein the plurality of instructions, when executed, further cause the server device to determine the identity of the second edge station as a function of a direction of movement of the terminal device.

21. The one or more machine-readable storage devices of claim 18, wherein to determine whether execution of the services is to be migrated includes receiving a notification from the terminal device or a central data center that the services are to be migrated.

22. The one or more machine-readable storage devices of claim 18, wherein the plurality of instructions, when executed, further cause the server device to pause execution of a service before the data utilized by the service is sent to the second server device.

23. The one or more machine-readable storage devices of claim 18, wherein to send the data includes sending the data to a target resource accessible by the second server device, and wherein the plurality of instructions, when executed, further cause the server device to send, to the second server device, resource access data indicative of an address range associated with the data sent for each service.

24. The one or more machine-readable storage devices of claim 18, wherein the plurality of instructions, when executed, further cause the server device to send, to the second server device, metadata indicative of a quality of service target associated with each service.

25. The one or more machine-readable storage devices of claim 18, wherein the plurality of instructions, when executed, further cause the server device to release, after a service has been migrated to the second server device, one or more resources that were utilized by the service before the service was migrated.

* * * * *

UNITED STATES PATENT AND TRADEMARK OFFICE
CERTIFICATE OF CORRECTION

| | |
|---|---|
| PATENT NO. | : 11,537,447 B2 |
| APPLICATION NO. | : 16/969728 |
| DATED | : December 27, 2022 |
| INVENTOR(S) | : Bernat et al. |

It is certified that error appears in the above-identified patent and that said Letters Patent is hereby corrected as shown below:

In the Claims

Column 14 in Claim 8, in Line 53, delete "compute".

Column 15 in Claim 12, in Line 20, delete "comprising".

Signed and Sealed this
Eleventh Day of April, 2023

Katherine Kelly Vidal
*Director of the United States Patent and Trademark Office*